US010800096B2

United States Patent
Iida et al.

(10) Patent No.: US 10,800,096 B2
(45) Date of Patent: Oct. 13, 2020

(54) RESIN POWDER FOR SOLID FREEFORM FABRICATION AND DEVICE FOR SOLID FREEFORM FABRICATION OBJECT

(71) Applicants: Sohichiroh Iida, Kanagawa (JP); Shigenori Yaguchi, Tokyo (JP); Hitoshi Iwatsuki, Kanagawa (JP); Yasuo Suzuki, Shizuoka (JP); Nozomu Tamoto, Shizuoka (JP); Shinzo Higuchi, Tokyo (JP); Akira Saito, Kanagawa (JP); Yasuyuki Yamashita, Kanagawa (JP); Kiichi Kamoda, Kanagawa (JP)

(72) Inventors: Sohichiroh Iida, Kanagawa (JP); Shigenori Yaguchi, Tokyo (JP); Hitoshi Iwatsuki, Kanagawa (JP); Yasuo Suzuki, Shizuoka (JP); Nozomu Tamoto, Shizuoka (JP); Shinzo Higuchi, Tokyo (JP); Akira Saito, Kanagawa (JP); Yasuyuki Yamashita, Kanagawa (JP); Kiichi Kamoda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 324 days.

(21) Appl. No.: 15/919,251

(22) Filed: Mar. 13, 2018

(65) Prior Publication Data

US 2018/0264721 A1   Sep. 20, 2018

(30) Foreign Application Priority Data

Mar. 17, 2017  (JP) ................................. 2017-052666
Jan. 11, 2018  (JP) ................................. 2018-002827

(51) Int. Cl.
   *B29C 64/153*   (2017.01)
   *B29C 64/264*   (2017.01)
   (Continued)

(52) U.S. Cl.
   CPC .............. *B29C 64/153* (2017.08); *B29B 9/06* (2013.01); *B29B 9/12* (2013.01); *B29C 64/10* (2017.08);
   (Continued)

(58) Field of Classification Search
   None
   See application file for complete search history.

(56) References Cited

U.S. PATENT DOCUMENTS

| 6,531,086 B1 | 3/2003 | Larsson |
| 6,667,424 B1 * | 12/2003 | Hamilton ................ A61F 13/15 |
| | | 604/360 |
| 2011/0143108 A1 | 6/2011 | Fruth et al. |
| 2011/0156300 A1 * | 6/2011 | Fruth ..................... B33Y 10/00 |
| | | 264/113 |
| 2016/0068671 A1 | 3/2016 | Yamabe et al. |

(Continued)

FOREIGN PATENT DOCUMENTS

| JP | 2015-515434 | 5/2015 |
| JP | 2016-037041 | 3/2016 |

(Continued)

OTHER PUBLICATIONS

Extended European Search Report dated Jul. 27, 2018 in Patent Application No. 18160389.5, 6 pages.

(Continued)

*Primary Examiner* — Alexandre F Ferre
(74) *Attorney, Agent, or Firm* — Oblon, McClelland, Maier & Neustadt, L.L.P.

(57) ABSTRACT

A resin powder for solid freeform fabrication includes resin particles having a significantly pillar-like form including resin particles having a concave portion on the circumferential side surface.

14 Claims, 6 Drawing Sheets

(51) Int. Cl.
*C08L 67/04* (2006.01)
*C08L 67/07* (2006.01)
*C08L 71/00* (2006.01)
*C08L 77/10* (2006.01)
*B33Y 30/00* (2015.01)
*B29C 64/10* (2017.01)
*B33Y 70/00* (2020.01)
*B29C 64/165* (2017.01)
*B33Y 10/00* (2015.01)
*B29B 9/06* (2006.01)
*B29B 9/12* (2006.01)
*B29K 67/00* (2006.01)
*B29K 71/00* (2006.01)
*B29K 77/00* (2006.01)

(52) U.S. Cl.
CPC .......... *B29C 64/165* (2017.08); *B29C 64/264* (2017.08); *B33Y 10/00* (2014.12); *B33Y 30/00* (2014.12); *B33Y 70/00* (2014.12); *C08L 67/04* (2013.01); *C08L 67/07* (2013.01); *C08L 71/00* (2013.01); *C08L 77/10* (2013.01); *B29B 2009/125* (2013.01); *B29K 2067/003* (2013.01); *B29K 2067/006* (2013.01); *B29K 2067/046* (2013.01); *B29K 2071/00* (2013.01); *B29K 2077/10* (2013.01); *B29K 2995/0041* (2013.01); *B29K 2995/0094* (2013.01)

(56) References Cited

U.S. PATENT DOCUMENTS

| | | |
|---|---|---|
| 2016/0160021 A1 | 6/2016 | Kojima et al. |
| 2016/0177122 A1 | 6/2016 | Naruse et al. |
| 2016/0236412 A1 | 8/2016 | Kusahara et al. |
| 2016/0271877 A1 | 9/2016 | Suzuki et al. |
| 2016/0271879 A1 | 9/2016 | Yamashita et al. |
| 2016/0272817 A1 | 9/2016 | Naruse et al. |
| 2016/0288206 A1 | 10/2016 | Ohtaki et al. |
| 2016/0368806 A1 | 12/2016 | Yamaguchi et al. |
| 2017/0209927 A1 | 7/2017 | Yamashita et al. |
| 2017/0217087 A1 | 8/2017 | Tamoto et al. |
| 2017/0225404 A1 | 8/2017 | Naruse et al. |
| 2018/0001520 A1 | 1/2018 | Saito et al. |
| 2018/0022024 A1 | 1/2018 | Saito et al. |
| 2018/0023219 A1 | 1/2018 | Saito et al. |

FOREIGN PATENT DOCUMENTS

| | | |
|---|---|---|
| WO | WO2008/057844 A1 | 5/2008 |
| WO | WO 2009/135521 A2 | 11/2009 |
| WO | WO2013/130553 A1 | 9/2013 |
| WO | WO 2017/212190 A1 | 12/2017 |

OTHER PUBLICATIONS

U.S. Appl. No. 15/822,775, filed Nov. 27, 2017, Kiichi Kamoda, et al.

* cited by examiner

RESIN POWDER FOR SOLID FREEFORM FABRICATION AND DEVICE FOR SOLID FREEFORM FABRICATION OBJECT

CROSS-REFERENCE TO RELATED APPLICATIONS

This patent application is based on and claims priority pursuant to 35 U.S.C. § 119 to Japanese Patent Application Nos. 2017-052666 and 2018-002827, filed on Mar. 17, 2017 and Jan. 11, 2018, respectively, in the Japan Patent Office, the entire disclosures of which are hereby incorporated by reference herein.

BACKGROUND

Technical Field

The present invention relates to a resin powder for solid freeform fabrication and a device for manufacturing a solid freeform fabrication object.

Description of the Related Art

Powder additive manufacturing is a fabrication method of solidifying layer by layer applying a laser or a binder to a powdery material.

The method of applying a laser is referred to as powder bed fusion (PBF) including known methods such as a selective laser sintering (SLS) method of forming a solid freeform fabrication object with selective irradiation of laser beams and a selective mask sintering (SMS) method of applying laser beams in a planar form using a mask. The method of using a binder includes, for example, binder jetting, which includes discharging ink containing a binder resin by inkjetting, etc. to form a solid freeform fabrication object.

Of these, a device employing the PBF method selectively irradiates a thin layer of powder of metal, ceramics, or resin with laser beams to melt the powder to cause it to adhere to each other to form a layer and repeats this operation to sequentially laminate the layer to obtain a solid freeform fabrication object (3D object).

Currently, polyamide resins are commonly used in the PBF method. In particular, polyamide 12 is preferably used because it has a relatively low melting point among polyamides, incurs less heat contraction, and has poor water absorbency.

In addition, demands for manufacturing not only prototypes but also products have been increasing so that research and development and launching of various types of resins haven been expected.

SUMMARY

According to the present invention, provided is an improved resin powder for solid freeform fabrication which includes resin particles having a significantly pillar-like form including resin particles having a concave portion on the circumferential side surface.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1A:
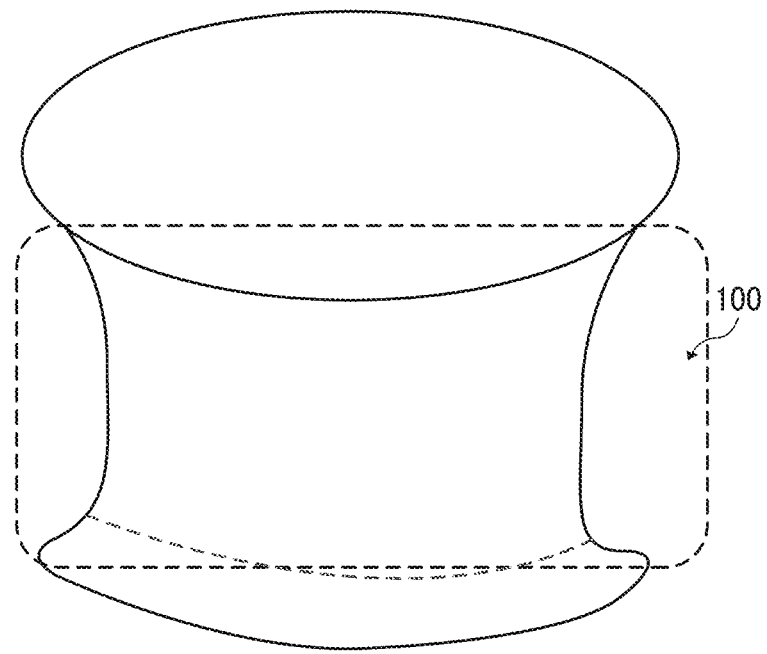
FIG. 1A is a diagram illustrating a schematic perspective view of an example of a resin particle having a significantly pillar-like form having a concave portion on its circumferential side surface.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

Resin Powder for Solid Freeform Fabrication

The resin powder for solid freeform fabrication (hereinafter referred to as resin powder) of the present disclosure contains resin particles having a significantly pillar-like form, including resin particles having a concave portion on its circumferential side surface, and other optional components.

The resin powder for solid freeform fabrication of the present disclosure was made on the knowledge that, typically, without adding a fluidizer, resin powder for solid freeform fabrication imparted poor smoothness to the powder surface during recoating of a powder layer and degraded the surface property of an obtained solid freeform fabrication object.

It is preferable that the resin powder for solid freeform fabrication of the present disclosure significantly contain no inorganic particle. "Significantly containing no inorganic particle" means that the amount of inorganic particles is less than 0.05 percent by mass and preferably 0 percent by mass (detection limit or below) to the total amount of the resin powder for solid freeform fabrication.

Resin Particle Having Significantly Pillar-Like Form

The resin particle having a significantly pillar-like form has a concave portion formed along the circumferential direction at the significantly center site of the circumferential side surface.

The resin particle having a significantly pillar-like form includes a base and an upper surface with a pillar-like form or tubular form. The form of the base or the upper surface has no particular limit and can be suitably selected to suit to a particular application. For example, a resin particle having a significantly cylindrical form (significantly circular pillar-like form) or a polygonal column-like form is allowed. The resin particle having a significantly cylindrical form includes an article having a circular or ellipsoidal base and upper surface, and the resin particle having a polygonal column-like form includes an article having, for example, a square or hexagon base and upper surface. As long as the portion between a base and an upper surface has a pillar-like area or a tubular area, the form of the base and the form of the upper surface are not necessarily the same. In addition, resin particles having a straight solid in which the pillar portion (side surface) is orthogonal to the base or the upper surface or a slanted solid in which the pillar portion (side surface) is not orthogonal to the base or the upper surface are allowed.

The resin powder for solid freeform fabrication contains the resin particle having a significantly pillar-like form having a concave portion formed along the circumferential direction at the significantly center site of the circumferential side surface. Therefore, the powder has a small repose angle and a good smoothness of powder surface during recoating. As a result, the surface property of an obtained solid freeform fabrication object can be furthermore enhanced.

As the resin particle having a significantly pillar-like form, in terms of productivity and stability of fabrication, an article close to a straight solid resin particle having a base and an upper surface significantly parallel to each other is preferable. The form of the resin particle having a significantly pillar-like form can be observed and determined by, for example, scanning electron microscope (S4200, manufactured by Hitachi Ltd.), wet-process particle size and form analyzer (FPIA-3000, manufactured by Sysmex Corporation), etc.

Figure 1B:
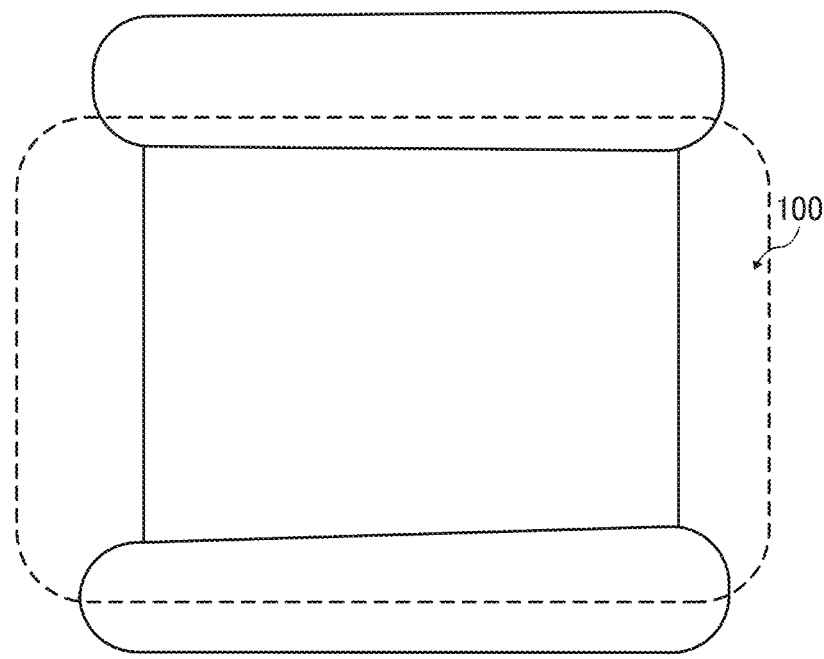
FIG. 1B is a diagram illustrating a side view of the resin particle having a significantly pillar-like form illustrated in FIG. 1A.

The concave portion formed along the circumferential direction at significantly center site of the circumferential side surface in the resin particle having a significantly pillar-like form having a concave portion formed along the circumferential direction at significantly center site of the circumferential side surface represents a portion having a diameter smaller than those of the base and the upper surface as illustrated in FIGS. 1A and 1B. FIG. 1A is a diagram illustrating a schematic perspective view of an example of the resin particle having a significantly pillar-like form having a concave portion formed along the circumferential direction at significantly center site of the circumferential side surface. FIG. 1B is a diagram illustrating a side view of the resin particle having a significantly pillar-like form illustrated in FIG. 1A. A concave portion 100 is at least partially formed on the significantly center site of the circumferential side surface of the resin particle having a significantly pillar-like form and preferably on the entire of the circumferential side surface. The significantly center site is allowed to be anywhere between the base and the upper surface and the concave portion 100 may be in contact with the upper surface of the base.

In addition, the concave portion 100 may form a constriction shape gently and smoothly connected with the upper surface and the base. The resin particle having a significantly pillar-like form has the concave portion 100 formed along the circumferential direction at significantly center site of the circumferential side surface. Therefore, the resin particle has a smaller contact area with other particles, so that particle resistance decreases, thereby improving flowability of the resin particle. In addition, to furthermore decrease the particle resistance and improve flowability, the particle preferably has no point at ends.

As the resin powder for solid freeform fabrication, it is preferable to contain only the resin powder having a significantly pillar-like form. However, the resin powder may contain other optional particles and other optional components.

Resin Particle Having Significantly Cylindrical Form

There is no specific limit to the significantly cylindrical form. It can be suitably selected to suit to a particular application. For example, resin particles having a true cylindrical form and resin particles having a cylindroid-like form are preferable. Of these, resin particles having a form closer to a true cylindrical form are preferable. In addition, the significantly cylindrical (significantly circular) of the resin particle having a significantly cylindrical form has a ratio of the major axis to the minor axis of from 1 to 10 and also includes an article having a partially chipped-off portion.

The resin particle having a significantly cylindrical form preferably has significantly circular planes facing each other. The size of the circles facing each other may not be identical. However, the diameter ratio of the large circle to the small circle is preferably 1.5 or less and more preferably 1.1 or less o increase the density.

The long side of the base of the resin particle having a significantly cylindrical form has no particular limit and can be suitably selected to suit to a particular application. For example, it is preferably from 5 to 200 µm. The long side of the base in the resin particle having a significantly cylindrical form means the diameter of the base. When the circle portion of the resin particle having a significantly cylindrical form is an ellipse, the long side means the major axis. The height (length between base and upper surface) of the significantly cylindrical form has no particular limit and can be suitably selected to suit to a particular application. For example, the height is preferably from 5 to 200 µm. When the long side of the base is within the range, fly of the resin powder occurring during forming a powder layer can be reduced. As a result, the surface of the powder layer becomes smooth. In addition, voids between resin powder can be reduced, thereby further enhancing surface property and dimension accuracy of a solid freeform fabrication object.

The resin particle may have a long side of the base and a height of less than 5 μm or greater than 200 μm. However, the content ratio of such resin particles is preferably less. To be specific, the proportion of the particles having a long side of the base and a height of from 5 to 200 μm is preferably 50 percent or more and more preferably 75 percent of more to all the particles.

It is preferable that the long side of the base and the height in the resin particle having a significantly cylindrical form be closer to each other. For example, the ratio of the height to the long side of the base of the resin particle is preferably from 0.5 to 2.0, and more preferably from 0.7 to 1.5. In the range specified above of the ratio of the height to the long side of the base of the resin particle, when forming a layer of a resin powder for solid freeform fabrication during solid freeform fabrication, voids are less and the resin powder for solid freeform fabrication tends to be densely packed. This is effective to enhance the strength and the dimension accuracy of an obtained solid freeform fabrication object.

Figure 2A:
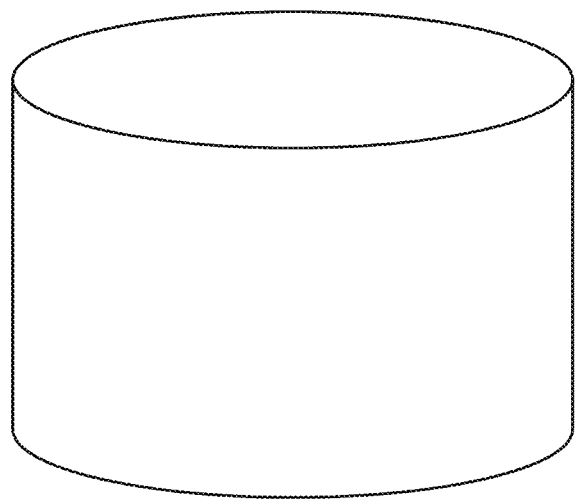
FIG. 2A is a diagram illustrating a schematic perspective view of an example of the resin particle having a significantly pillar-like form.
Figure 2B:
FIG. 2B is a diagram illustrating a side view of the resin particle having a significantly pillar-like form illustrated in FIG. 2A.
Figure 2C:
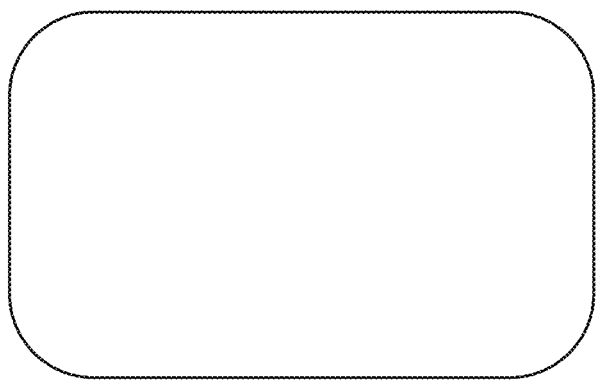
FIG. 2C is a diagram illustrating a side view of an example of the resin particle having a significantly pillar-like form having no apex at the ends.

The resin particle having a significantly pillar-like form has a pillar-like form having a base and an upper surface. Preferable forms have no points at ends. The point means an angle portion existing in the pillar-like form. For example, FIG. 2A is a diagram illustrating a schematic perspective view of an example of the resin particle having a significantly pillar-like form. FIG. 2B is a side view of the resin particle having a significantly pillar-like form illustrated in FIG. 2A. In this case, the pillar-like form has a rectangular form with four angle portions, i.e., points (apexes). FIG. 2C is a diagram illustrating an example of a form without such points. Whether a resin particle having a significantly pillar-like form has a point can be checked by a projected image of the side surface of the resin particle. For example, the side surface of a resin particle having a significantly pillar-like form is observed by a scanning electron microscope (S4200, manufactured by Hitachi Ltd.), etc. to acquire a two-dimensional image thereof. In this case, the projected image has four sides. When the portion formed of two adjacent sides is defined as an end part, if the end part is formed of only two adjacent straight lines, an angle is formed so that the particle has a point. If the end part is arc as illustrated in FIG. 2C, no point is formed.

Such a resin particle having a significantly pillar-like form has a smaller repose angle, flowability is enhanced and smoothness of powder surface of a solid freeform fabrication object is further improved. That is, this is extremely suitable to improve the surface property of a solid freeform fabrication object.

It is more preferable that, as the resin powder for solid freeform fabrication, the proportion of the resin particle having a significantly pillar-like form having a concave portion formed along the circumferential direction at significantly center site of the circumferential side surface be high. Specifically, the proportion of the resin particle having a significantly pillar-like form having a concave portion formed along the circumferential direction at significantly center site of the circumferential side surface to all the resin particle having a significantly pillar-like form is preferably 50 percent or more, more preferably 75 percent or more, and particularly preferably 90 percent or more. At the proportion of 50 percent or greater, flowability of the resin powder for solid freeform fabrication is enhanced so that, without a fluidizer, smoothness of the powder surface during recoating becomes excellent, and the surface property of an obtained solid freeform fabrication object can be improved.

Whether the resin particle having a significantly pillar-like form has a concave portion formed along the circumferential direction at significantly center site of the circumferential side surface can be determined by, for example, as described above, observing the resin powder for solid freeform fabrication with a scanning electron microscope (S4200, manufactured by Hitachi Ltd.), etc. to obtain two-dimensional images and calculating the proportion of the particle having a concave portion formed along the circumferential direction at significantly center site of the circumferential side surface to all the resin particle having a significantly pillar-like form from the two-dimensional images. For example, the two-dimensional images of 10 vision fields are obtained by the method described above to obtain the proportion of the resin particle having a significantly pillar-like form having a concave portion formed along the circumferential direction at significantly center site of the circumferential side surface to all the resin particle having a significantly pillar-like form, followed by averaging for determination.

The resin particle having a significantly pillar-like form having a concave portion formed along the circumferential direction at significantly center site of the circumferential side surface has not necessarily neat significantly cylindrical forms or polygonal column-like forms but may include a form having an extended end portion, a crushed form, or a twisted or curved form.

To change the resin particle having a significantly pillar-like form into the resin powder for solid freeform fabrication into the resin particle having a significantly pillar-like form having a concave portion formed along the circumferential direction at significantly center site of the circumferential side surface, any method capable of applying a physical force to the resin particle having a significantly pillar-like form is applicable. For example, it is possible to use a known processing device utilizing mechanical pulverization of high speed rotation or high speed impact or a ball mill.

Repose Angle

The repose angle of the resin powder for solid freeform fabrication is preferably 60 degrees or less and more preferably 55 degrees or less. At a repose angle of 60 degrees or less, flowability of the resin powder for solid freeform fabrication can be secured, and smoothness of the powder surface during recoating can be enhanced.

Figure 3:
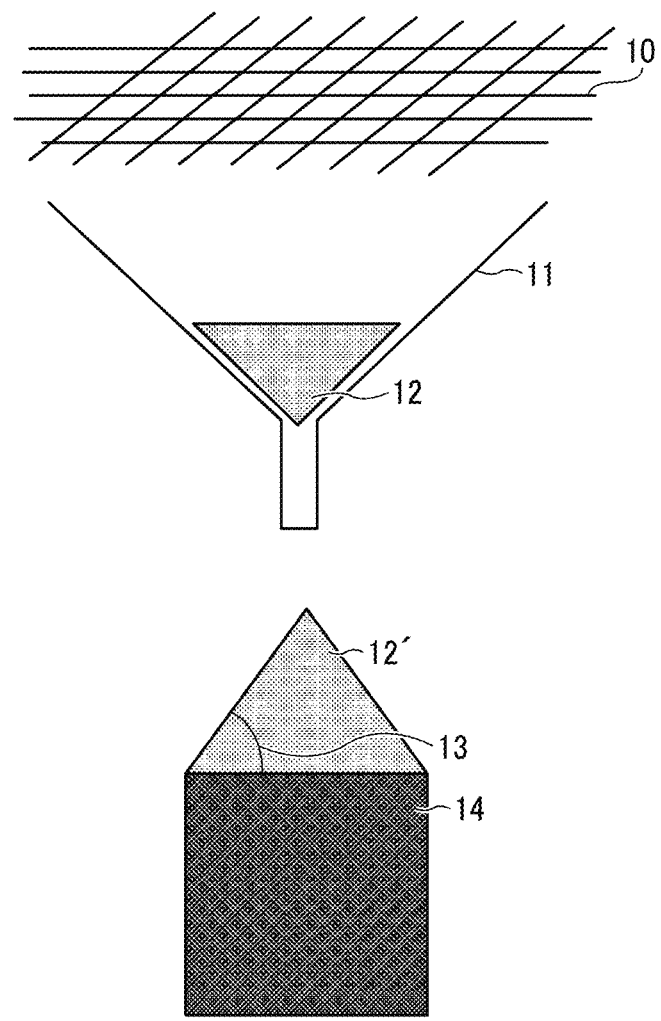
FIG. 3 is a schematic diagram illustrating an example of the measuring method of a repose angle.

The repose angle is, as illustrated in FIG. 3, an angle 13 formed between the floor surface and the slope of a mountain a resin powder 12' for solid freeform fabrication forms on a base 14 when a resin powder 12 for solid freeform fabrication screened by a sieve 10 free falls from a funnel 11 to the base 14. The repose angle is an index of flowability of a resin powder for solid freeform fabrication, and a smaller repose angle reads better flowability. The powder in a device for solid freeform fabrication is smoothed by a rotation roller to form additive layers. Although resin powder having good flowability can form a smooth surface, resin powder having poor flowability forms a rough surface on the layers. This has an adverse impact on the surface texture of a final solid freeform fabrication object, so that the surface property thereof deteriorates.

The repose angle can be measured, as illustrated in FIG. 3, by measuring the angle 13 by the sieve 10 (based on JIS format Z8801-1-2000, opening diameter of 125 μm) and a bulk specific gravity measuring device (Z-2504, manufactured by "Kuramochi Kagaku Kikai Seisakusho") including the funnel 11 and the base 14. The sieve 10 is disposed above the specific gravity measuring device and powder to be measured is caused to pass through and accumulate the powder on the stage 14. As the bulk specific gravity diameter, an article conforming to an opening diameter of 2.5 mm of the funnel 11 is used, and the base 14 having a pillar-like form having a diameter of 30 mm is disposed below the funnel 11. The resin powder 12 for solid freeform fabrication is charged into the sieve 10 from above and caused to pass through the funnel 11 and forms a mountain of the resin powder 12' for solid freeform fabrication on the base 14. The resin powder 12 for solid freeform fabrication is charged in such an amount that at least the resin powder 12' for solid freeform fabrication spills over the base 14 and the form of a cone can be confirmed from the side. The repose angle is measured by an image capture using a camera. The camera is disposed 60 mm away from the base 14 (from the lens) and at the same height as the upper surface of the base 14 (based on the height of the lens). Thereafter, the side surface of the mountain is taken by the camera. The angle constituted of the base surface and the slope of the mountain is the repose angle. This angle is calculated from the obtained image using trigonometry. The measuring is conducted twice and the average is determined as the repose angle.

Average Circularity

The average circularity of the resin powder for solid freeform fabrication is preferably 0.80 or higher, more preferably 0.83 or higher, and furthermore preferably 0.85 or higher in the particle size range of from 0.5 to 200 μm. The upper limit of the average circularity is preferably 1.0 or less and more preferably 0.98 or less. The average circularity is an index for the degree of circularity and the average circularity of 1 means true circle. To determine the average circularity, circularity is firstly obtained by the following relation 1, where S represents an area (number of pixels) and L represents a perimeter. The arithmetical means thereof is obtained as the average circularity.

$$\text{Circularity} = 4\pi S/L^2 \quad \text{Relation 1}$$

The average circularity can be easily obtained by, for example, digitization based on the measuring using a wet process flow type particle size and form analyzer (FPIA-3000, manufactured by Sysmex Corporation). This wet process flow type particle size and form analyzer takes particle images at high speed in a liquid suspension flowing in a glass cell by a charge-coupled device (CCD) and analyzes individual particle images in real time. This device, which is capable of taking images of such particles and image analyzing, is suitable to obtain the average circularity. The number of measuring counts of the particles has no particular limit and is preferably 1,000 or greater and more preferably 3,000 or greater.

50 Percent Cumulative Volume Particle Diameter

The thickness of the powder layer in a solid freeform fabrication device employing powder additive manufacturing is preferably from about 5 to about 500 μm and more preferably from about 50 to about 200 μm.

The 50 percent cumulative volume particle diameter of the resin powder for solid freeform fabrication is preferably from 5 to 200 μm and more preferably from 20 to 150 μm in terms of dimension stability.

Within the range specified above for the 50 percent cumulative volume particle diameter (D50), fly of the resin powder occurring during forming a powder layer can be reduced. As a result, the surface of the powder layer becomes smooth. In addition, voids between resin powder can be reduced, thereby further enhancing surface property of a solid freeform fabrication object.

The 50 percent cumulative volume particle diameter can be measured by, for example, a wet process flow type particle size and form analyzer (FPIA-3000, manufactured by Sysmex Corporation) or a particle size distribution measuring device (microtrac MT3300 EXII, manufactured by MicrotracBEL Corp).

The proportion of the resin particle having a significantly pillar-like form is preferably 50 percent or more, more preferably 75 percent or more, and 90 percent or more to the total content of the resin powder for solid freeform fabrication. When the proportion is 50 percent or more, packing density can be significantly increased, which is extremely effective to enhance the dimension accuracy and the strength of an obtained solid freeform fabrication object. The proportion of the resin particle having a significantly pillar-like form can be obtained by, for example, collecting resin powder for solid freeform fabrication, observing it with scanning electron microscope (SEM), and counting the number of the resin particle having a significantly pillar-like form having a long side of the base and a height of from 5 to 200 μm to the number of all the particles of the obtained SEM images.

Fluidizer

The fluidizer partially or entirely covers the surface of the resin powder for solid freeform fabrication to improve flowability of the resin powder for solid freeform fabrication. Such a fluidizer covers the surface of the resin powder to take effect. Some of them may be embedded in the resin powder for solid freeform fabrication.

An example of the fluidizer is an inorganic particle.

The inorganic particle has no specific limitation and is suitably selected to suit to a particular application. For example, titania, zinc oxide, alumina, silica, and hydroxyapatite are usable.

The volume average particle diameter of the inorganic particle has no particular limit and can be suitably selected to suit to a particular application. For example, the volume average particle diameter is preferably less than 10 μm. The volume average particle diameter can be measured by using, for example, a particle size analyzer (FPIA-3000, manufactured by Sysmex Corporation).

The proportion of the inorganic particle as the fluidizer is preferably less than 0.05 percent by mass, more preferably less than 0.03 percent by mass, and particularly preferably from 0 percent by mass (detection limit or below) to the total mass of the resin powder for solid freeform fabrication. When the proportion is less than 0.05 percent by mass, the fluidizer is not decomposed during fabrication so that it can be prevented from remaining in a solid freeform fabrication object as impurities, thereby preventing deterioration of strength and purity of a solid freeform fabrication object.

As the resin particle having a significantly pillar-like form of the resin powder for solid freeform fabrication, articles close to mono-dispersion formed as a collective entity having a uniform height with no deviation about the form and size are preferable. Due to this, the dimension accuracy and the strength of a solid freeform fabrication object can be further improved.

Specifically, the particle diameter ratio (Mv/Mn) of the volume average particle diameter (Mv) of the resin powder for solid freeform fabrication to the number average particle diameter (Mn) of the resin powder for solid freeform fabrication is preferably 2.00 or less, more preferably 1.5 or less, and particularly preferably 1.2 or less.

The volume average particle diameter Mv of the resin powder for solid freeform fabrication is preferably from 5 to 200 μm and more preferably from 20 to 100 μm.

The number average particle diameter Mn of the resin powder for solid freeform fabrication is preferably from 2.5 to 200 μm and more preferably from 10 to 100 μm.

The volume average particle diameter (Mv) and the number average particle diameter (Mn) can be measured by using a particle size distribution measuring instrument (Microtrac MT3300EXII, manufactured by MicrotracBEL Corp.).

Specific Gravity

The specific gravity of the resin powder for solid freeform fabrication is preferably 0.8 or more. When the specific gravity is 0.8 or greater, it is possible to prevent secondary agglomeration of the particles during recoating. Conversely, the specific gravity is preferably 3.0 or less to meet lightweight needs as a substitute of metal. The specific gravity can be obtained by measuring true specific gravity. The true specific gravity is obtained by measuring the density of a sample by measuring the mass thereof from the volume of the sample. The volume is obtained by changing the volume and pressure of gas (He gas) at a constant temperature by using a dry-process pycnometer (AccuPyc 1330, manufactured by Shimadzu Corporation) utilizing gas-phase replacement method.

As the resin for use in the resin particle having a significantly pillar-like form powder, using a thermoplastic resin is preferable. The thermoplastic resin is plasticized and melted when heat is applied. Of the thermoplastic resin, a crystalline resin is preferable. The crystalline resin has a melt peak as measured according to ISO 3146 regulation (plastic transition temperature measuring method, JIS K7121 format).

The resin powder for solid freeform fabrication preferably has a melting point of 100 degrees C. or higher as measured according to ISO 3146 regulation. It is preferable that the melting point of the resin powder for solid freeform fabrication as measured according to ISO 3146 regulation be 100 degrees C. or higher because it covers the range of the heat resistance temperature for exteriors of products, etc. The melting point can be measured according to ISO 3146 regulation (plastic transition temperature measuring method, JIS K7121 format) using a differential scanning calorimeter (DSC). When a plurality of melting points exist, the melting point on the higher temperature side is used.

As the crystalline resin, a crystal-controlled crystalline thermoplastic resin is preferable. As the crystalline thermoplastic resin, for example, it can be obtained by a known method utilizing exterior stimuli such as heat treatment, drawing, crystal nuclear material, and ultrasonic wave treatment. Crystalline thermoplastic resins having controlled crystal size and crystalline orientation are preferable in terms that error occurring during recoating can be reduced.

The method of manufacturing the crystalline thermoplastic resin has no particular limit and can be suitably selected to suit to a particular application. For example, resin powder having a solid freeform fabrication is heated to the glass transition temperature or higher of each resin and thereafter subject to annealing to increase crystallinity or an addition of crystal nucleating agent to further increase crystallinity before the annealing. Also, it is suitable to use ultrasonic wave treatment or dissolve a resin in a solvent and slowly evaporate it to enhance crystallinity. Moreover, a method of applying an external electric field to grow crystal and a processing method such as pulverization and cutting of a further drawn article for higher crystallization and orientation are suitable.

In the annealing, for example, the resin is heated at a temperature 50 degrees higher than the glass transition temperature thereof for three days and thereafter slowly cooled down to room temperature.

In the drawing, for example, using an extruder, melted resin is drawn in fibrous form while stirring it at temperatures 30 degrees C. or greater higher than the melting point. To be specific, a melted resin is drawn to around 1/1 to around 1/10 to obtain a fiber. The form of the cross section of the fiber can be determined by the form of the nozzle orifice of the extruder. In the present disclosure, when the resin particle having a significantly pillar-like form is a resin particle having a significantly cylindrical form, a nozzle orifice having a circular form is used. In the case of a polygonal column-like form, a nozzle orifice having a polygonal column-like form is used. Productivity is expected to increase in proportion to the number of nozzles. Regarding the drawing, the maximum drawing ratio can be changed depending on resin and melt viscosity.

In the application of ultrasonic wave, for example, glycerin (reagent grade, manufactured by Tokyo Chemical Industry Co. Ltd.) solvent is added to a resin in an amount of five times as much as the resin followed by heating to the temperature 20 degrees C. higher than the melting point. Thereafter, ultrasonic wave is applied thereto by an ultrasonic generator (ultrasonicator UP200S, manufactured by Hielscher Ultrasonics GmbH) at a frequency of 24 KHz and an amplitude of 60 percent for two hours. Thereafter, the resultant is rinsed with a solvent of isopropanol at room temperature preferably followed by vacuum drying.

As the external electric field application, for example, after heating a resin powder for solid freeform fabrication at the glass transition temperature or higher, an alternative electric field (500 Hz) of 600 V/cm is applied to the resin powder for one hour, followed by slow cooling down.

In the powder bed fusion (PBF) method, a large temperature difference (temperature window) about crystal layer change is preferable to prevent warp, thereby enhancing fabrication stability. To obtain this large temperature difference, it is preferable to use a resin powder for solid freeform fabrication having a larger difference between the melt-starting temperature and the recrystallization temperature during cooling. The crystalline thermoplastic resin mentioned above is particularly preferable.

The crystalline thermoplastic resin can be determined by whether to satisfy at least one of the following relations (conditions) (1) to (3).

(1): $Tmf1 > Tmf2$, where $Tmf1$ represents a melting starting temperature of an endothermic peak as the resin powder is heated to a temperature 30 degrees C. higher than the melting point of the resin powder at a temperature rising speed of 10 degrees C. per minute and $Tmf2$ represents a melting starting temperature of an endothermic peak as the resin powder is heated to a temperature 30 degrees C. higher than the melting point of the resin powder at a temperature rising speed of 10 degrees C. per minute, cooled down to −30 degrees C. or lower at a temperature falling speed of 10 degrees C. per minute, and heated to the temperature 30 degrees C. higher than the melting point at a temperature rising speed of 10 degrees C. per minute for a second time, and both $Tmf1$ and $Tmf2$ are measured in differential scanning calorimetry measuring according to ISO 3146 regulation. The melting starting temperature of the endothermic peak represents a temperature at a point −15 mW lower from a straight line drawn parallel to X axis from a site where quantity of heat becomes constant after endotherm at the melting point is finished to a lower temperature side.

(2): $Cd1 > Cd2$, where $Cd1$ represents a crystallinity obtained from an energy amount of the endothermic peak when the resin powder is heated to a temperature 30 degrees C. higher than the melting point of the resin powder at a temperature rising speed of 10 degrees C. per minute and Cd2 represents a crystallinity obtained from an energy amount of the endothermic peak as the resin powder is heated to a temperature 30 degrees C. higher than the melting point of the resin powder at a temperature rising speed of 10 degrees C. per minute, cooled down to −30 degrees C. or lower at a temperature falling speed of 10 degrees C. per minute, and heated to the temperature 30 degrees C. higher than the melting point at a temperature rising speed of 10 degrees C. per minute for a second time, and both Cd1 and Cd2 are measured in differential scanning calorimetry measuring according to ISO 3146 regulation.

(3): $Cx1>Cx2$, where $Cx1$ represents a crystallinity of the resin powder obtained by X-ray diffraction measuring and $Cx2$ represents a crystallinity obtained by X-ray diffraction measuring as the resin powder is heated to the temperature 30 degrees C. higher than the melting point thereof at a temperature rising speed of 10 degrees C. per minute, cooled down to −30 degrees C. or lower at a temperature falling speed of 10 degrees C. per minute, and thereafter heated to the temperature 30 degrees C. higher than the melting point at a temperature rising speed of 10 degrees C. per minute in nitrogen atmosphere.

In the relations (1) to (3), properties of the identical resin powder for solid freeform fabrication are regulated from different points of views. The relations (1) to (3) are relevant to each other. Whether a resin powder for solid freeform fabrication of the present disclosure can be determined as a crystalline thermoplastic resin depends on whether the resin powder for solid freeform fabrication satisfies at least one of the relations (1) to (3). The relations (1) to (3) can be measured by the following method:

Measuring Method of Melting Starting Point of Condition 1 According to Differential Scanning Calorimetry Measuring The measuring method of melting starting temperature of differential scanning calorimetry (DSC) of the condition (1) is based on the measuring method of ISO 3146 regulation (plastic transition temperature measuring method, JIS K7121 format). A differential scanning calorimeter (for example, DSC-60A, manufactured by Shimadzu Corporation) is used to measure the melting starting temperature (Tmf1) of the endothermic peak when the resin powder is heated to the temperature 30 degrees C. higher than the melting point thereof at a temperature rising speed of 10 degrees C. per minute. Thereafter, the resin powder is cooled down to −30 degrees C. or lower at a temperature falling speed of 10 degrees C. per minute and heated to the temperature 30 degrees C. higher than the melting point at a temperature rising speed of 10 degrees C. per minute to measure the melting starting temperature (Tmf2) of the endothermic peak. The melting starting temperature of the endothermic peak represents a temperature at a point −15 mW lower from a straight line drawn parallel to X axis from a site where quantity of heat becomes constant after endotherm at the melting point is finished to the lower temperature side.

Measuring Method of Crystallinity of Condition 2 According to Differential Scanning Calorimetry Measuring The measuring method of crystallinity of differential scanning calorimetry (DSC) of the condition (2) is based on the measuring method according to ISO 3146 regulation (plastic transition temperature measuring method, JIS K7121 format). The energy amount (heat amount of melting) of an endothermic peak when heated to the temperature 30 degrees C. higher than the melting point of powder resin at a temperature rising speed of 10 degrees C. per minute is measured to obtain crystallinity (Cd1) from the heat amount of melting to the heat amount of complete crystallization. Thereafter, the resin powder is cooled down to −30 degrees C. or lower at a temperature falling speed of 10 degrees C. per minute and heated to the temperature 30 degrees C. higher than the melting point at a temperature rising speed of 10 degrees C. per minute to measure the energy amount of the endothermic peak so that crystallinity (Cd2) can be obtained as the ratio of the heat amount of melting to the heat amount of complete crystallization.

Measuring Method of Crystallinity of Condition 3 Using X-Ray Analyzer

Crystallinity of resin powder of the condition 3 is obtained by placing the resin powder on glass plate to measure crystallinity (Cx1) thereof by an X-ray analyzer (for example, Discover 8, manufactured by Bruker) including a two-dimensional detector at a 2θ range of from 10 to 40 at room temperature. Next, in the DSC, in a nitrogen atmosphere, the resin is heated to 30 degrees C. higher than the melting point thereof at a temperature rising speed of 10 degrees C. per minute. The temperature is maintained for 10 minutes and the temperature of the sample (resin powder) is back to room temperature by cooled down to −30 degrees C. at a temperature falling speed of 10 degrees C. per minute. Crystallinity (Cx2) can be measured as in the case of Cx1.

The thermoplastic resin for use in the resin powder for solid freeform fabrication has no particular limit and can be suitably selected to suit to a particular application. Specific examples include, but are not limited to, polymers such as polyolefin, polyamide, polyester, polyether, polyarylketone, polyphenylene sulfide, a liquid crystal polymer (LCP), polyacetal (POM), polyimide, and a fluorochemical resin. These can be used alone or in combination.

Specific examples of the polyolefin include, but are not limited to, polyethylene and polypropylene. These can be used alone or in combination.

The polyamide includes aromatic polyamides.

Specific examples include, but are not limited to, polyamide 410 (PA410), polyamide 6 (PA6), polyamide 66 (PA66), polyamide 610 (PA610), polyamide 612 (PA612), polyamide 11 (PA11), polyamide 12 (PA12), semi-aromatic polyamide 4T (PA4T), polyamide MXD6 (PAMXD6), polyamide 6T (PA6T), polyamide 9T (PA9T), and polyamide 10T (PA10T). These can be used alone or in combination.

PA9T is also referred to as polynonamethylene terephthal amide, constituted of a diamine having 9 carbon atoms and a terephthalic acid monomer. In general, since carbon acid side is an aromatic series, PA9T is referred to as semi-aromatic series. Moreover, the polyamide in the present disclosure includes aramid, constituted of p-phenylenediamine and a terephathalic acid monomer as aromatic series in which diamine side is also aromatic.

Specific examples of the polyester include, but are not limited to, polyethyleneterephthalate (PET), polybutadiens terephthalate (PBT), and polylactic acid (PLA). To impart heat resistance, polyester including aromatic series partially including terephthalic acid or isophthalic acid is also suitably used.

Specific examples of polyether include, but are not limited to, polyether etherketone (PEEK), polyetherketone (PEK), polyether ketone ketone (PEKK), polyaryl ether ketone (PAEK), polyether ether ketone ketone (PEEKK), and polyetherkeone ether ketone ketone (PEKEKK).

In addition to the polyether mentioned above, crystalline polymers are also suitable. Specific examples include, but are not limited to, polyacetal, polyimide, and polyether sulfone. It is also suitable to use polyamide having two melting peaks such as PA8T (it is necessary to raise the temperature of a resin to the second melting peak or higher to completely melt the resin).

The resin powder for solid freeform fabrication may include resin powder containing non-crystalline resin or an additive such as a flame retardant, a plasticizer, a stabilizer, and a crystal nucleating agent other than the thermoplastic resin mentioned above. These can be used alone or in combination. These can be mixed with the thermoplastic resin to be present in the resin powder for solid freeform fabrication or can be attached to the surface thereof.

As the resin powder for solid freeform fabrication, it is possible to contain, for example, a toughening agent. Toughening agents are added to mainly enhance the strength and contained as a filler. As the toughening agent, glass filler, glass bead, carbon fiber, aluminum balls, and articles listed in the pamphlet of WO 2008/057844 are used. These can be used alone or in combination and may be contained in a resin.

It is preferable to use suitably-dried resin powder as the resin powder for solid freeform fabrication of the present disclosure. Using a vacuum drier or silica gel is suitable to dry the resin powder before usage.

In addition, the resin powder for solid freeform fabrication can be used in the SLS method or SMS method and has properties striking a balance between parameters such as particle size, particle size distribution, heat transfer properties, melt viscosity, bulk density, flowability, melting temperature, and recrystallization temperature.

To promote the degree of laser sintering in the PBF method, the bulk density of the resin powder for solid freeform fabrication is preferably large although the density of the resin varies. For example, the tap density is preferably 0.35 g/mL or greater, more preferably 0.40 g/mL or greater, and particularly preferably 0.5 g/mL or greater.

A solid freeform fabrication object formed by laser sintering using the resin powder for solid freeform fabrication has excellent surface property and mechanical strength.

Furthermore, it is preferable that solid freeform fabrication objects formed by laser sintering using the resin powder for solid freeform fabrication be free of unsuitable process properties such as warp, distortion, and fuming caused by phase changes between sintering and cooling after sintering.

Method of Manufacturing Resin Particle Having Significantly Pillar-Like Form Having Concave Portion on Circumferential Side Surface To obtain the resin particle having a significantly pillar-like form, it is possible to utilize any method of manufacturing the resin particle having a significantly pillar-like form. For example, the resin particle having a significantly pillar-like form can be manufactured by a method of preparing fiber of a resin followed by cutting to directly obtain a resin particle having a significantly cylindrical form or a polygonal column-like form, a method of manufacturing a resin particle having a significantly pillar-like form from a film form, or a method of subjecting an obtained resin particle having a polygonal column-like form to post-processing to obtain a resin particle having a significantly cylindrical form.

How to prepare fiber is, for example, using an extruder, drawing melted resin in a fibrous form during stirring at temperatures 30 degrees C. or greater higher than the melting point. It is preferable to draw the melted resin to around 1/1 to around 1/10 to obtain the fiber. The form of the base of the resin particle having a significantly pillar-like form is determined by the form of the nozzle orifice of an extruder. For example, if the form of the base of a column, i.e., the cross section of fiber, is circular, a nozzle having a circular orifice is used. For a polygonal column-like form, the nozzle orifice is selected in accordance with the form. It is preferable that the dimension accuracy of a solid freeform fabrication object be higher. The circular form of a plane portion is at least 10 percent or less at radius. In addition, it is preferable to have more nozzle orifices to increase productivity.

For the cutting, a cutting machine employing a guillotine method in which both the upper edge and the lower edge are blades or a cutting machine employing a straw cutter method of cutting with an upper edge with not a blade but a board disposed on the bottom side can be used. It is also preferable to use a known device which directly cuts the fiber to 0.005 to 0.2 mm or a $CO_2$ laser to cut the fiber, etc.

To the cut fiber, an energy is applied using a known device such as a mechanical stirrer having a rotor rotating at high speed by power or a bead mill in which beads, etc. are caused to repetitively collide against powder for a particular length of time. As a result, the end portion of the surface of the particle is processed and deformed so that a resin particle having a significantly pillar-like form having a concave portion formed along the circumferential direction at a significantly center site of the circumferential side surface can be manufactured.

Method of Manufacturing Solid Freeform Fabrication Object and Device for Manufacturing Solid Freeform Fabrication Object The method of manufacturing a solid freeform fabrication object includes a layer forming process to form a layer containing the resin powder for solid freeform fabrication of the present disclosure and a powder adhesion process to cause the resin powder for solid freeform fabrication to adhere to each other in a selected area of the layer, and repeating the layer forming process and the powder adhesion process, and may furthermore optionally include other processes.

The device for manufacturing a solid freeform fabrication object includes a layer forming device to form a layer containing the resin powder for solid freeform fabrication object of the present disclosure and a powder adhesion device to cause the resin powder for solid freeform fabrication to adhere to each other in a selected area of the layer and may furthermore optionally include other devices.

The method of manufacturing a solid freeform fabrication object can be suitably executed by the device for manufacturing a solid freeform fabrication object. As the resin powder for solid freefrom fabrication, it is possible to use the same resin powder for solid freeform fabrication of the present disclosure.

The resin powder for solid freeform fabrication can be used for any of the device for manufacturing a solid freeform fabrication object employing a powder additive manufacturing method. The device manufacturing a solid freeform fabrication object employing a powder additive manufacturing method forms a powder layer and thereafter causes resin powder in a selected area to adhere to each other with a different device depending on methods. For example, there are an electromagnetic device (irradiator to emit electromagnetic wave) employing SLS method or SMS method and a liquid discharging device employing a binder jetting method. The resin powder for solid freeform fabrication of the present disclosure can be applicable to any of those and each of a device for solid freeform fabrication including a device for powder additive manufacturing.

For the device for manufacturing a solid freeform fabrication object employing SLS method or SMS method utilizing the electromagnetic wave irradiation, as the electromagnetic wave irradiation source for use in electromagnetic irradiation, for example, it is possible to use laser that emits ultraviolet rays, visible light, infrared rays, etc., microwave, discharging, electron beams, a radiant heater, an LED lamp, a combination thereof.

In addition, for the method of causing the resin powder for solid freeform fabrication to selectively adhere to each other utilizing electromagnetic wave irradiation, absorption of electromagnetic wave can be changed in terms of efficiency. For example, it is possible to cause the resin powder for solid freeform fabrication to contain an absorbent or retarder.

Figure 4:
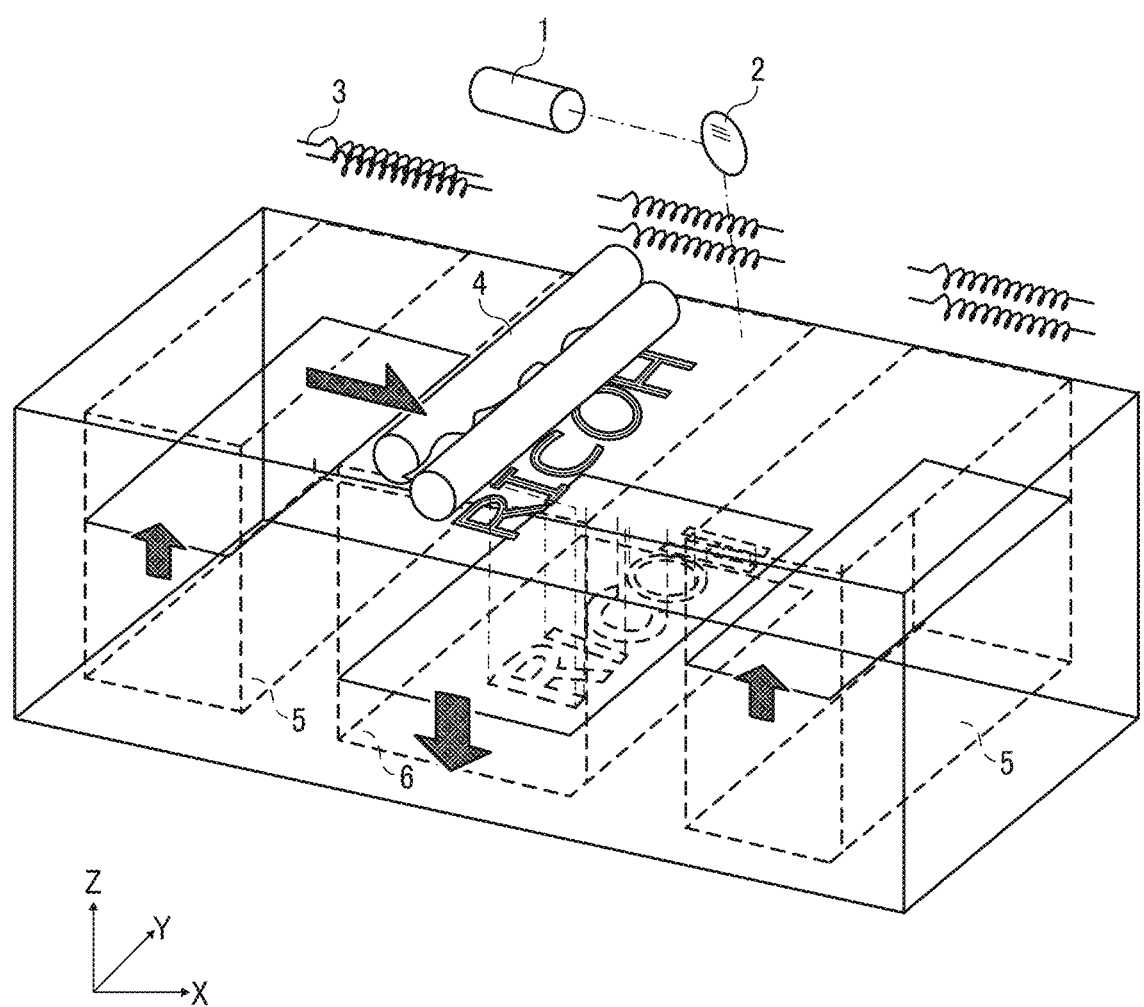
FIG. 4 is a schematic diagram illustrating an example of the device for manufacturing a solid freeform fabrication object for use in the method of manufacturing a solid freeform fabrication object.

An example of the device for manufacturing a solid freeform fabrication object is described referring to FIG. 4. FIG. 4 is a schematic diagram illustrating an example of the device for manufacturing a solid freeform fabrication object. As illustrated in FIG. 4, powder is stored in a supplying tank 5 for powder and supplied to a laser scanning space 6 using a roller 4 in proportion to the usage amount. It is preferable that the temperature of the supply tank 5 be controlled by a heater 3. The laser scanning space 6 is irradiated with the laser beams emitted from an electromagnetic wave irradiation source 1 using a reflection mirror 2. The powder is sintered with the heat of the laser beams to obtain a solid freeform fabrication object.

The temperature of the supply tank 5 is preferably 10 degrees C. or more lower than the melting point of the powder.

The temperature of the part bed in the laser scanning space 6 is preferably 5 degrees C. or more lower than the melting point of the powder.

The power of the laser has no particular limit and can be suitably selected to suit to a particular application. For example, it is preferably from 10 to 150 W.

In another embodiment, solid freeform fabrication objects in the present disclosure can be manufactured using selective mask sintering (SMS) technologies. The SMS process is described in, for example, the specification of U.S. Pat. No. 6,531,086.

In the SMS process, powder layers are partially and selectively irradiated with infra red, which is selectively shielded by using a shielding mask. When utilizing the SMS process to manufacture a solid freeform fabrication object from the resin powder for solid freeform fabrication of the present disclosure, it is possible and preferable to contain material to enhance infrared absorption of the resin powder for solid freeform fabrication. For example, the resin powder for solid freeform fabrication may contain at least one kind of heat absorbent and/or dark color material (such as carbon fiber, carbon black, carbon nanotube, and cellulose nanofiber).

In yet another embodiment, using the resin powder for solid freeform fabrication of the present disclosure, a solid freeform fabrication object can be manufactured by the device for solid freeform fabrication employing binder jetting mentioned above. The method of manufacturing a solid freeform fabrication object includes a layer forming process to form a layer containing the resin powder for solid freeform fabrication of the present disclosure and a powder adhesion process to discharge liquid to a selected area of the layer followed by drying to adhere to each other, and repeating the layer forming process and the powder adhesion process, and may furthermore optionally include other processes.

The device for manufacturing a solid freeform fabrication object includes a layer forming device to form a layer including the resin powder for solid freeform fabrication of the present disclosure and a liquid discharging device to discharge liquid to a selected area of the layer and may furthermore optionally include other devices. As the discharging device to discharge liquid, it is preferable to employ inkjet method in terms of dimension accuracy and fabrication speed of an obtained solid freeform fabrication object.

FIG. 5 (FIG. 5A to FIG. 5F) is a schematic diagram illustrating an example of the process of the binder jetting method. The device for manufacturing a solid freeform fabrication object illustrated in FIG. 5 includes a powder storage tank 111 for fabrication and a powder storage tank 12 for supplying. Each of these powder storage tanks 111 and 112 has a stage 113 movable up and down and places the resin powder for solid freeform fabrication of the present disclosure on the stage 113 to form a layer formed of the resin powder for solid freeform fabrication. A fabrication liquid supplying device 115 is disposed over the powder storage tank 111 for fabrication to discharge a liquid material 116 for solid freeform fabrication toward the resin powder for solid freeform fabrication in the powder storage tank. Furthermore, the device for manufacturing a solid freeform fabrication includes a resin powder layer forming device 114 (hereinafter also referred to as recoater) capable of supplying the resin powder for solid freeform fabrication from the powder storage tank 112 for supplying to the powder storage tank 111 for fabrication and smoothing the surface of the resin powder layer in the powder storage tank 111 for fabrication.

Figure 5A:
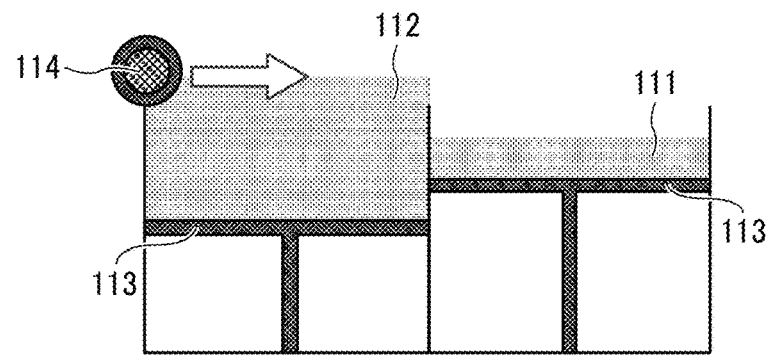
FIG. 5A is a schematic diagram illustrating an example of the process of forming a powder layer having a smooth surface.
Figure 5B:
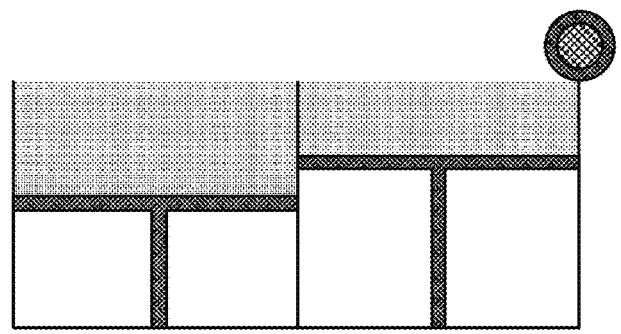
FIG. 5B is a schematic diagram illustrating an example of the process of forming a powder layer having a smooth surface.

FIGS. 5A and 5B are diagrams illustrating the step of supplying the resin powder from the powder storage tank 112 for supplying to the powder storage tank 111 for fabrication and the step of forming the resin powder layer having a smooth surface. Each stage 113 of the powder storage tank 111 for fabrication and the powder storage tank 112 for supplying is controlled to adjust the gap therebetween to obtain a desired layer thickness. Thereafter, the resin powder layer forming device 114 is moved from the powder storage tank 112 for supplying to the powder storage tank 111 for fabrication to form a resin powder layer in the powder storage tank 11 for fabrication.

Figure 5C:
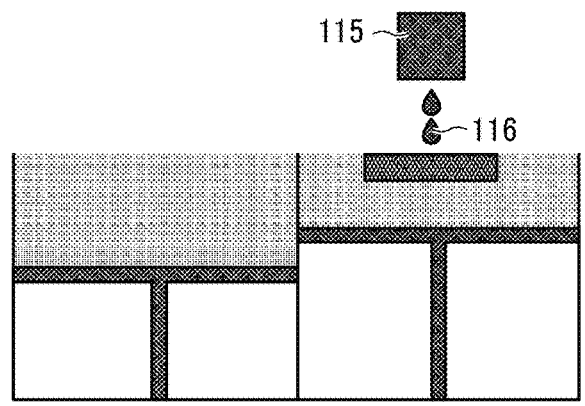
FIG. 5C is a schematic diagram illustrating an example of the process of dripping a liquid material for solid freeform fabrication.

FIG. 5C is a diagram illustrating the process of dripping the liquid material 116 for solid freeform fabrication to the resin powder layer in the powder storage tank 111 for fabrication by using a fabrication liquid supplying device 115 for solid freeform fabrication. At this point, the position where the liquid material 116 for solid freeform fabrication is dripped on the resin powder layer is determined based on two-dimensional image data (slice data) obtained by slicing the solid freeform fabrication object into multiple plane layers.

Figure 5D:
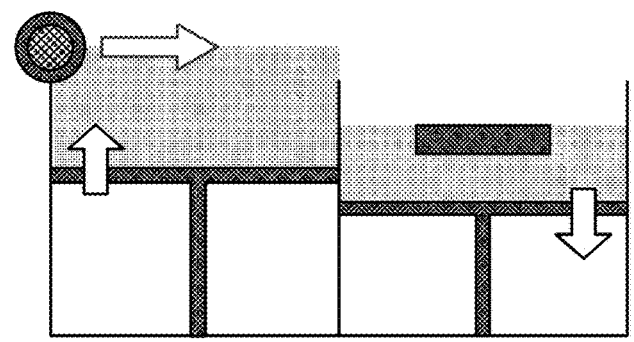
FIG. 5D is a schematic diagram illustrating an example of the process of forming a new resin powder layer in a powder storage tank for solid freeform fabrication.
Figure 5E:
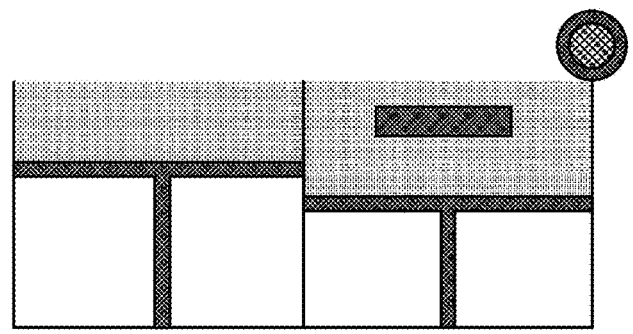
FIG. 5E is a schematic diagram illustrating an example of the process of forming a new resin powder layer in a powder storage tank for solid freeform fabrication.

In FIGS. 5D and 5E, the stage 113 of the powder storage tank 112 for supplying is elevated and the stage 13 of the powder storage tank 111 for fabrication is lowered while controlling the gap therebetween to obtain a desired layer thickness. Thereafter, the resin powder layer forming device 114 is moved again from the powder storage tank 112 for supplying to the powder storage tank 111 for fabrication. As a result, a new resin powder layer is formed in the powder storage tank 111 for solid freeform fabrication.

Figure 5F:
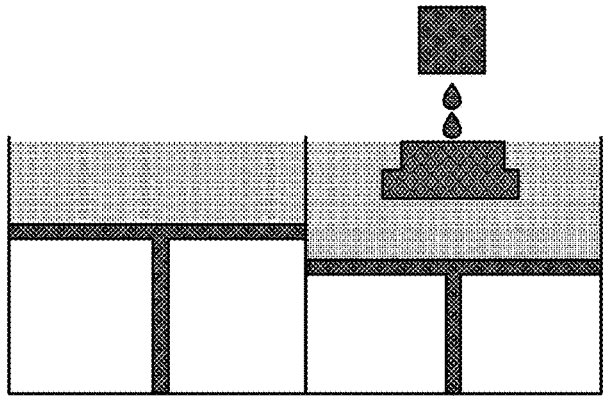
FIG. 5F is a schematic diagram illustrating an example of the process of dripping a liquid material for solid freeform fabrication again.

FIG. 5F is a diagram illustrating the process of dripping the liquid material 116 for solid freeform fabrication again onto the resin powder layer in the powder storage tank 111 for fabrication by using the fabrication liquid supplying device 115. This series of processes is repeated. Subsequent to optional drying, the resin powder to which no liquid material for solid freeform fabrication is attached is removed as extra powder to obtain a solid freeform fabrication object.

It is preferable to contain an adhesive to cause the resin powder to adhere to each other. The adhesive can be dissolved in liquid to be discharged. Alternatively, the adhesive can be mixed with the resin powder as an additive particle. The adhesive is preferably dissolved in liquid to be discharged. For example, the adhesive is water-soluble if the liquid is mainly composed of water.

Examples of the water-soluble adhesive are polyvinyl alcohol (PVA) resins, polyvinyl pyrrolidone, polyamides, polyacrylic amides, polyethylene imine, polyethyleneoxides, polyacrylate resins, cellulose resins, and gelatin. Of these, polyvinyl alcohol is more preferably used to enhance strength and dimension accuracy of a solid freeform fabrication object.

The resin powder for solid freeform fabrication has good flowability so that the surface property of an obtained solid freeform fabrication object can be enhanced. This is not limited to the method utilizing electromagnetic irradiation but can be applied to all the devices for solid freeform fabrication employing powder additive manufacturing such as binder jetting method.

Solid Freeform Fabrication Object

The solid freeform fabrication object can be suitably manufactured by executing the method of manufacturing a solid freeform fabrication object using the resin powder for solid freeform fabrication of the present disclosure.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but not limited thereto.

Repose angle, 50 percent cumulative volume particle diameter, average circularity, and specific gravity were measured in the following manner. The results are shown in Table 1.

Repose Angle

The repose angle was measured as illustrated in FIG. 3.

As illustrated in FIG. 3, the measuring device includes the sieve 10 (based on JIS format Z8801-1-2000, opening diameter of 125 μm) and a bulk specific gravity measuring device (Z-2504, manufactured by "Kuramochi Kagaku Kikai Seisakusho"). For the bulk specific gravity diameter, an article conforming to the opening diameter of 2.5 mm of the funnel 11 was used, and the base 14 having a pillar-like form having a diameter of 30 mm was disposed below the funnel 11. The resin powder 12 for solid freeform fabrication was charged into the sieve 10 from above, caused to pass through the funnel 11, and formed a mountain of the resin powder 12' for solid freeform fabrication on the base 14. The resin powder 12 for solid freeform fabrication was charged in such an amount that at least the resin powder 12' for solid freeform fabrication spilled over the base 14 and the form of a cone was confirmed from the side. The repose angle was measured by an image capture using a camera. The camera is disposed 60 mm away from the base 14 (from the lens) and at the same height as the upper surface of the base 14 (based on the height of the lens). Thereafter, the side surface of the mountain is taken by the camera. The angle constituted of the base surface and the slope of the mountain is the repose angle. This angle was calculated from the obtained image using trigonometry.

The measuring was conducted twice and the average was determined as the repose angle.

50 Percent Cumulative Volume Particle Diameter

The volume particle diameter was measured using a particle size distribution measuring instrument (Microtrac MT3300EXII, manufactured by MicrotracBEL Corp.) employing a drying process (atmosphere) method without using a solvent, utilizing particle refractive index per resin powder for solid freeform fabrication, to calculate the 50 percent cumulative volume particle diameter. The particle refractive index was set as 1.57 of polybutylene terephthalate (PBT) resin.

Average Circularity

Using a wet-process flow type particle size and form analyzer (FPIA-3000, manufactured by Sysmex Corporation), particle form images were taken in a state where the counting number of powder particles was 1,000 or more to obtain the average circularity of the resin particle having a pillar-like form in the particle diameter range of from 0.5 to 200 μm. The circularity was measured twice for each and the average of the two was determined as the average circularity.

Specific Gravity

The specific gravity was obtained by measuring the density of a sample. The density was obtained by measuring the mass of the sample from the volume thereof. The volume was obtained by changing volume and pressure of gas (He gas) at a constant temperature by using a dry-process pycnometer (AccuPyc 1330, manufactured by Shimadzu Corporation) utilizing gas-phase replacement method.

Example 1

Using an extruder (manufactured by The Japan Steel Works, LTD.), pellets of polybutylene terephthalate (PBT) resin (NOVADURAN® 5020, melting point of 218 degrees C., glass transition temperature of 43 degrees C., manufactured by Mitsubishi Engineering-Plastics Corporation) were stirred at a temperature 30 degrees C. higher than the melting point and thereafter fiber was obtained using a nozzle having an orifice of a circular form. The number of fibers extruded from the nozzle was 100. The pellet was drawn to about four times to obtain a resin fiber having a fiber diameter of 60 μm with an accuracy of from −4 to +4 μm.

The thus-obtained resin fiber was cut to a fiber length of 60 μm by a cutting device (NJ series 1200 type, manufactured by OGINO SEIKI CO., LTD.) employing straw cutting method to obtain resin powder containing resin particles having a significantly cylindrical form. This powder was subject to treatment by a spheroidizing device (MP type mixer MP5A/1, manufactured by NIPPON COKE & ENGINEERING. CO., LTD.) at a stirring speed of 9,600 rpm for 5 minutes.

The thus-obtained resin powder for solid freeform fabrication was checked by a scanning electron microscope (S4200, manufactured by Hitachi, Ltd.). Most particles were resin particles having a significantly pillar-like form having a concave portion formed along the circumferential direction at significantly center site of the circumferential side surface, and the depth of the concave portion was about 1 μm. In addition, the height of the resin particle having a significantly cylindrical form was measured. It was from 50 to 70 µm. Using the scanning electron microscope, two dimensional images in 10 vision fields were obtained. The proportion of the resin particle having a significant cylindrical form to all the particles in each vision field was 88 percent on average.

Example 2

The resin powder for solid freeform fabrication was obtained in the same manner as in Example 1 except that the stirring time of the spheroidizing device was changed from 5 minutes to 20 minutes. The thus-obtained resin powder for solid freeform fabrication was checked in the same manner as in Example 1. Most particles had a concave portion formed along the circumferential direction at significantly center site of the circumferential side surface, and the depth of the concave portion was about 5 µm. In addition, the height of the resin particle having a significantly cylindrical form was measured. It was from 50 to 70 µm. The proportion of the resin particle having a significant cylindrical form to all the particles in each vision field was 98 percent on average.

Comparative Example 1

A polybutylene terephthalate (PBT) resin (NOVA-DURAN® 5020, melting point: 218 degrees C., glass transition temperature: 43 degrees C., manufactured by Mitsubishi Engineering-Plastics Corporation) was subject to frost shattering at −200 degrees C. using a cold pulverization system (LINREX MILL LX1, manufactured by Hosokawa Micron Corporation) to obtain a resin powder for solid freeform fabrication having a particle diameter of from 5 to 200 µm.

The thus-obtained resin powder for solid freeform fabrication was observed with a scanning electron microscope (S4200, manufactured by Hitachi, Ltd.). Particles having various forms such as an ellipsoidal form, a bar-like form, and a plate-like form were present. However, there was no particle having a concave portion formed along the circumferential direction at significantly center site of the circumferential side surface.

Comparative Example 2

A resin powder for solid freeform fabrication was manufactured in the same manner as in Example 1 except that the resin powder was not subject to stirring. The thus-obtained resin powder for solid freeform fabrication was checked in the same manner as in Example 1.

There was no particle having a significantly cylindrical form having a concave portion formed along the circumferential direction at significantly center site of the circumferential side surface.

Comparative Example 3

0.1 percent by mass silica (AEROSIL RX200, surface preparation agent HMDS, average primary particle diameter of 12 nm, manufactured by Nippon Aerosil Co., Ltd.) as a fluidizer was mixed with the resin powder for solid freeform fabrication obtained in Comparative Example 1 using a stirrer (Tubula system T2F type, manufactured by Willya bachofen) to obtain a resin powder for solid freeform fabrication containing the fluidizer. The stirring speed in the stirrer was 100 rpm and stirring time was five minutes.

The thus-obtained resin powder for solid freeform fabrication was observed with a scanning electron microscope (S4200, manufactured by Hitachi, Ltd.). Particles having various forms such as an ellipsoidal form, a bar-like form, and a plate-like form were present and were not different from the forms of the resin powder of Comparative Example 1.

Reference Example 1

0.1 percent by mass silica (AEROSIL RX200, surface preparation agent HMDS, average primary particle diameter of 12 nm, manufactured by Nippon Aerosil Co., Ltd.) as a fluidizer was mixed with the resin powder for solid freeform fabrication obtained in Comparative Example 2 in the same manner as in Comparative Example 3 to obtain a resin powder for solid freeform fabrication containing the fluidizer.

The thus-obtained resin powder for solid freeform fabrication was observed with a scanning electron microscope (S4200, manufactured by Hitachi, Ltd.). The powder was constituted of particles having a significantly cylindrical form and was not different from the forms of the resin powder of Comparative Example 2.

Manufacturing of the solid freeform fabrication object and the thus-obtained solid freeform fabrication object were evaluated with regard to recoating (smoothness) and surface property. The results are shown in Table 1.

Recoating Property (Smoothness)

The surface of layers laminated during solid freeform fabrication was visually observed to evaluate recoating property. The temperature during additive manufacturing (laminating) was the actual condition in which a fabrication object of a target material can be manufactured.

Evaluation Criteria

A (Good): Visually very smooth recoating surface and no rough portion recognized B (Marginal): Visually slightly rough portion recognized on recoating surface C (Bad): Visually clearly rough portion and coarse surface recognized on recoating surface Manufacturing of Solid Freeform Fabrication Object A solid freeform fabrication object was manufactured by an SLS method fabrication device (AM S5500P, manufactured by Ricoh Company, Ltd.) using the obtained resin powder for solid freeform fabrication. The conditions were: average layer thickness of 0.1 mm, a laser output of from 10 to 150 W, a laser scanning space of 0.1 mm, and a part bed temperature of −3 degrees C. below the melting point. Based on data such as CAD of a cuboid solid freeform fabrication object (sample for dimension) (mm) having a side of 5 cm and an average thickness of 0.5 cm, the sample mentioned above was manufactured.

Surface Property

The surface of the obtained solid freeform fabrication object was visually checked, observed with an optical microscope, and subject to organoleptic test. In the organoleptic test, the sample was touched by hands and the surface property, in particular smoothness, was evaluated from the tactile impression. These results were collectively checked to evaluate the surface property based on the following evaluation criteria.

Evaluation Criteria

A (Excellent): Very smooth surface with no annoying rough portion or coarse surface B (Good): No problem about smoothness on surface and roughness and coarse surface allowable C (Marginal): No smooth surface with clearly visible rough portion and coarse surface D (Bad): Hooked on surface and many defects such as roughness and distortion of surface recognized

TABLE 1

| | | Resin | Fluidizer | Form | Whether there is concave portion formed on circumference side plane of particle | Depth of concave portion (μm) |
|---|---|---|---|---|---|---|
| Example | 1 | PBT | — | Significant pillar like form | Yes | 2.0 |
| | 2 | PBT | — | Significant pillar like form | Yes | 5.0 |
| Comparative Example | 1 | PBT | — | Non-significant pillar like form | No | — |
| | 2 | PBT | — | Significant pillar like form | No | — |
| | 3 | PBT | Silica 0.1 percent by mass | Non-significant pillar like form | No | — |
| Reference Example | 1 | PBT | Silica 0.1 percent by mass | Significant pillar like form | No | — |

| | | Resin powder for solid free-form | | | | | |
|---|---|---|---|---|---|---|---|
| | | Resin | Repose angle (degree) | 50 percent accumulative volume particle diameter (μm) | Average circularity (μm) | Specific gravity (μm) | Evaluation result | |
| | | | | | | | Recoating property | Surface property |
| Example | 1 | PBT | 55.0 | 69.3 | 0.85 | 1.31 | A | A |
| | 2 | PBT | 50.0 | 70.1 | 0.88 | 1.31 | A | S |
| Comparative Example | 1 | PBT | 63.0 | 57.5 | 0.77 | 1.30 | C | C |
| | 2 | PBT | 58.0 | 73.6 | 0.83 | 1.31 | B | B |
| | 3 | PBT | 58.0 | 59.2 | 0.76 | 1.31 | B | B |
| Reference Example | 1 | PBT | 47.0 | 72.5 | 0.84 | 1.32 | A | A |

Aspects of the present disclosure are, for example, as follows.

1. A resin powder for solid freeform fabrication contains resin particles having a significantly pillar-like form, some of which has a concave portion on the circumferential side surface.
2. The resin powder of 1 mentioned above, wherein the resin powder has a 50 percent cumulative volume particle diameter from 5 to 200 μm.
3. The resin powder according to 1 or 2 mentioned above, wherein the resin powder has an average circularity of 0.80 or greater in the resin particle diameter range of from 0.5 to 200 μm.
4. The resin powder according to any one of 1 to 3 mentioned above, wherein the resin powder has an average circularity of 0.83 or greater in the resin particle diameter range of from 0.5 to 200 μm.
5. The resin powder according to any one of 1 to 4 mentioned above, wherein the resin powder has a particle diameter ratio of a volume average particle diameter to a number average particle diameter of 2.00 or less.
6. The resin powder according to any one of 1 to 5 mentioned above, wherein the resin powder has a specific gravity of 0.8 or greater.
7. The resin powder according to any one of 1 to 6 mentioned above further includes at least one member selected from the group consisting of polyolefin, polyamide, polyester, polyether, polyarylketone, polyphenylene sulfide, a liquid crystal polymer, polyacetal, polyimide, and a fluorochemical resin.
8. The resin powder according to any one of 1 to 7 mentioned above, wherein the polyamide includes an aromatic polyamide.
9. The resin powder according to any one of 1 to 7 mentioned above, wherein the polyamide includes at least one member selected from the group consisting of polyamide 410, polyamide 4T, polyamide 6, polyamide 66, polyamide MXD6, polyamide 610, polyamide 6T, polyamide 11, polyamide 12, polyamide 9T, polyamide 10T, and aramid.
10. The resin powder according to any one of 7 to 9 mentioned, wherein the polyester includes at least one member selected from the group consisting of polyethylene terephthalate, polybutylene terephthalate, and polylactate.
11. The resin powder according to any one of 7 to 10 mentioned above, wherein the polyether includes at least one member selected from the group consisting of polyether ether ketone, polyether ketone, and polyether ketone ketone.
12. The resin powder according to any one of 1 to 11 mentioned above, wherein the resin powder has a repose angle of 60 degrees or less.
13. The resin powder according to any one of 1 to 12 mentioned above, satisfying at least one of the following relations (1) to (3):

(1): Tmf1>Tmf2, where Tmf1 represents a melting starting temperature of an endothermic peak as the resin powder is heated to a temperature 30 degrees C. higher than the melting point of the resin powder at a temperature rising speed of 10 degrees C. per minute and Tmf2 represents a melting starting temperature of an endothermic peak as the resin powder is heated to a temperature 30 degrees C. higher than the melting point of the resin powder at a temperature rising speed of 10 degrees C. per minute, cooled down to −30 degrees C. or lower at a temperature falling speed of 10 degrees C. per minute, and heated to the temperature 30 degrees C. higher than the melting point at a temperature rising speed of 10 degrees C. per minute for a second time, and both Tmf1 and Tmf2 are measured in differential scanning calorimetry measuring according to ISO 3146 regulation. The melting starting temperature of the endothermic peak represents a temperature at a point −15 mW lower from a straight line drawn parallel to X axis from a site where quantity of heat becomes constant after endotherm at the melting point is finished to a lower temperature side.

(2): Cd1>Cd2, where Cd1 represents a crystallinity obtained from an energy amount of the endothermic peak when the resin powder is heated to a temperature 30 degrees C. higher than the melting point of the resin powder at a temperature rising speed of 10 degrees C. per minute and Cd2 represents a crystallinity obtained from an energy amount of the endothermic peak as the resin powder is heated to a temperature 30 degrees C. higher than the melting point of the resin powder at a temperature rising speed of 10 degrees C. per minute, cooled down to −30 degrees C. or lower at a temperature falling speed of 10 degrees C. per minute, and heated to the temperature 30 degrees C. higher than the melting point at a temperature rising speed of 10 degrees C. per minute for a second time, and both Cd1 and Cd2 are measured in differential scanning calorimetry measuring according to ISO 3146 regulation, and (3): Cx1>Cx2, where Cx1 represents a crystallinity of the resin powder obtained by X-ray diffraction measuring and Cx2 represents a crystallinity obtained by X-ray diffraction measuring as the resin powder is heated to the temperature 30 degrees C. higher than the melting point thereof at a temperature rising speed of 10 degrees C. per minute, cooled down to −30 degrees C. or lower at a temperature falling speed of 10 degrees C. per minute, and thereafter heated to the temperature 30 degrees C. higher than the melting point at a temperature rising speed of 10 degrees C. per minute in nitrogen atmosphere.

14. A device for manufacturing a solid freeform fabrication object includes a layer forming device to form a layer including the resin powder for solid freeform fabrication of any one of 1 to 13 mentioned above and a powder adhesion device to cause the resin powder to adhere to each other in a selected area of the layer.

15. The device according to 14 mentioned above, wherein the powder adhesion device includes an electromagnetic wave irradiating device.

16. A method of manufacturing a solid freeform fabrication object includes layer forming to form a layer containing the resin powder for solid freeform fabrication of any one of 1 to 13 mentioned above, powder adhering to cause the resin powder to adhere to each other in a selected area of the layer, and repeating the layer forming and the powder adhering.

17. The method according to 16 mentioned above, wherein the powder adhesion includes emitting an electromagnetic wave.

18. The method according to 17 mentioned above, wherein the electromagnetic wave emitting source for use in the electromagnetic emission is ultraviolet rays.

19. A solid freeform fabrication object manufactured according to the method of manufacturing a solid freeform fabrication object of any one of 16 to 18 mentioned above.

According to the present disclosure, provided is an improved resin powder for solid freeform fabrication which is capable of imparting excellent smoothness to the powder surface during recoating of a powder layer and good surface property to an obtained solid freeform fabrication object without adding a fluidizer.

Having now fully described embodiments of the present invention, it will be apparent to one of ordinary skill in the art that many changes and modifications can be made thereto without departing from the spirit and scope of embodiments of the invention as set forth herein.

What is claimed is:

1. A resin powder for solid freeform fabrication, comprising:
   resin particles having a significantly pillar-like form, including resin particles having a concave portion on a circumferential side surface,
   wherein the resin powder has a repose angle of 55 degrees or less.

2. The resin powder according to claim 1, wherein the resin powder has a 50 percent cumulative volume particle diameter from 5 to 200 μm.

3. The resin powder according to claim 1, wherein the resin powder has an average circularity of 0.80 or greater in a particle diameter range of from 0.5 to 200 μm.

4. The resin powder according to claim 1, wherein the resin powder has an average circularity of 0.83 or greater in a particle diameter range of from 0.5 to 200 μm.

5. The resin powder according to claim 1, wherein the resin powder has a particle diameter ratio of a volume average particle diameter to a number average particle diameter of 2.00 or less.

6. The resin powder according to claim 1, wherein the resin powder has a specific gravity of 0.8 or greater.

7. The resin powder according to claim 1, further comprising at least one member selected from the group consisting of polyolefin, polyamide, polyester, polyether, polyarylketone, polyphenylene sulfide, a liquid crystal polymer, polyacetal, polyimide, and a fluorochemical resin.

8. The resin powder according to claim 7, wherein the polyamide comprises an aromatic polyamide.

9. The resin powder according to claim 7, wherein the polyamide comprises at least one member selected from the group consisting of polyamide 410, polyamide 4T, polyamide 6, polyamide 66, polyamide MXD6, polyamide 610, polyamide 6T, polyamide 11, polyamide 12, polyamide 9T, polyamide 10T, and aramid.

10. The resin powder according to claim 7, wherein the polyester comprises at least one member selected from the group consisting of polyethylene terephthalate, polybutylene terephthalate, and polylactate.

11. The resin powder according to claim 7, wherein the polyether comprises at least one member selected from the group consisting of polyether ether ketone, polyether ketone, and polyether ketone ketone.

12. The resin powder according to claim 1, satisfying at least one of the following relations (1) to (3):
   (1): Tmf1>Tmf2, where Tmf1 represents a melting starting temperature of an endothermic peak as the resin powder is heated to a temperature 30 degrees C. higher than a melting point of the resin powder at a temperature rising speed of 10 degrees C. per minute and Tmf2 represents a melting starting temperature of an endothermic peak as the resin powder is heated to a temperature 30 degrees C. higher than the melting point of the resin powder at a temperature rising speed of 10 degrees C. per minute, cooled down to −30 degrees C.

or lower at a temperature falling speed of 10 degrees C. per minute, and heated to the temperature 30 degrees C. higher than the melting point at a temperature rising speed of 10 degrees C. per minute for a second time, and both Tmf1 and Tmf2 are measured in differential scanning calorimetry measuring according to ISO 3146 regulation, wherein the melting starting temperature of the endothermic peak represents a temperature at a point −15 mW lower from a straight line drawn parallel to X axis from a site where quantity of heat becomes constant after endotherm at the melting point is finished to a lower temperature side, (2): Cd1>Cd2, where Cd1 represents a crystallinity obtained from an energy amount of the endothermic peak when the resin powder is heated to a temperature 30 degrees C. higher than the melting point of the resin powder at a temperature rising speed of 10 degrees C. per minute and Cd2 represents a crystallinity obtained from an energy amount of the endothermic peak as the resin powder is heated to a temperature 30 degrees C. higher than the melting point of the resin powder at a temperature rising speed of 10 degrees C. per minute, cooled down to −30 degrees C. or lower at a temperature falling speed of 10 degrees C. per minute, and heated to the temperature 30 degrees C. higher than the melting point at a temperature rising speed of 10 degrees C. per minute for a second time, and both Cd1 and Cd2 are measured in differential scanning calorimetry measuring according to ISO 3146 regulation, and (3): C×1>C×2, where C×1 represents a crystallinity of the resin powder obtained by X-ray diffraction measuring and C×2 represents a crystallinity obtained by X-ray diffraction measuring as the resin powder is heated to the temperature 30 degrees C. higher than the melting point thereof at a temperature rising speed of 10 degrees C. per minute, cooled down to −30 degrees C. or lower at a temperature falling speed of 10 degrees C. per minute, and thereafter heated to the temperature 30 degrees C. higher than the melting point at a temperature rising speed of 10 degrees C. per minute in nitrogen atmosphere.

13. A device for manufacturing a solid freeform fabrication object, comprising:
 a layer forming device configured to form a layer comprising the resin powder of claim 1; and
 a powder adhesion device configured to cause particles of the resin powder to adhere to each other in a selected area of the layer.

14. The device according to claim 12, wherein the powder adhesion device comprises an electromagnetic wave irradiating device.

* * * * *